Aug. 21, 1956 J. T. MARVIN 2,759,575
CONNECTOR STRIP
Filed June 9, 1953

INVENTOR.
John T. Marvin

United States Patent Office 2,759,575
Patented Aug. 21, 1956

2,759,575

CONNECTOR STRIP

John T. Marvin, Xenia, Ohio, assignor to General Motors Corporation, Detroit, Mich., a corporation of Delaware Application June 9, 1953, Serial No. 360,417

5 Claims. (Cl. 189—78)

This invention relates to elastomeric strips and more particularly to elastomeric strips adapted to sealingly connect sheet-like panels in an edge to edge relation.

Various forms of mounting strips are now used for connecting sheet-like panels, examples of these being disclosed in Eichner Patent 2,189,138 and Geyer Patent 2,492,566 both assigned to the assignee of the present invention. While strips of this type have been found satisfactory in many instances, difficulties have been encountered, in certain applications, in attaching the strips in position, for example, when connecting curved panels and particularly when the panels are of relatively large size.

This invention is directed to an improved mounting strip which can be more easily assembled between the panels to be connected and thereafter provide a uniformly tight and leak-proof seal between the connected parts.

In carrying out this objective, the body of the strip is formed with integral means for holding a portion of the strip in a retracted position when the panel engaging portion is pivoted on an integral hinge to provide a free passage for an edge of a panel into a panel receiving groove during the assembly of the panel and the strip together with integral means on the strip for holding the strip in sealing engagement with the panel after the connection is formed.

A further object of the present invention is to provide an elastomeric sealing strip having means integrally formed therewith which are adapted to hold the lip, which forms a portion of a panel receiving groove, in a retracted position for facilitating the assembly of the strip and panel and for holding said lip in a panel engaging position after the holding means have been released and the lip is pivoted to its panel engaging position.

Another advantage embodied in the present invention is to provide a sealing strip particularly adapted to be used in connection with automotive bodies and the like, which strip acts as a joining and sealing means between the body and the windshield or the rear window of the automobile, and has a portion thereof adapted to be held in retracted position, to permit a margin of one part to be joined by the strip to readily pass into a groove during the assembly of the part and strip.

Further objects and advantages of the present invention will be apparent from the following description reference being had to the accompanying drawings wherein a preferred embodiment of the present invention is clearly shown.

Figure 1:
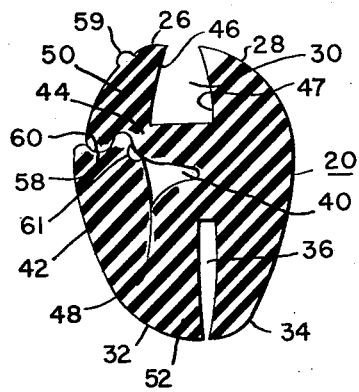
Fig. 1 shows a section of rubber strip made according to this invention.

In the form shown in Fig. 1, the connector strip 20, of suitable elastomeric material has a uniform cross section throughout its length and is adapted to mount the margin of a glass panel 22 within a marginal aperture of a relatively thin metal panel 24, for example, the curved rear window or windshield in a suitable aperture in an automobile body.

The body portion 20 of the strip has two pairs of wings or lip portions 26 and 28 forming a glass panel 22 receiving groove 30 therebetween and a second pair of oppositely disposed wing or lip portions 32 and 34 oppositely located to lips 26 and 28 for forming a second panel 24 receiving groove 36 that is in opposed relation to groove 30.

A longitudinally extending groove or hollow 40, formed on the side of the strip between lips 26 and 32, normally closed by a strut or abutment 42, is located so as to provide a thin section of material or neck portion 44 about which the enlarged portion of lip 26 may pivot with respect to the main body of strip 20. Groove 40 is suitably sized so as to receive the enlarged portion of lip 26 therein when the lip is pivoted on its neck portion 44 so that a wall 46 of lip 26 is substantially at right angles to another wall 47 of lip 28, thus opening the groove 30 to facilitate the assembly of the glass panel 22 with a strip 20.

The strut portion 42 is integrally formed on lip 32 by a short and flexible neck portion 48, which permits the strut 42 to bodily pivot about the neck 48 as a hinge. The body of the strut portion 42 is of such substantial thickness and rigidity that it is capable of exerting considerable endwise compression to force the relatively stiff enlargements 50 and 52, as located on lips 26 and 32 respectively, apart so that the lips 26 and 32 will be held in suitably tight contact with the respective panels 22 and 24 when the strut 42 is in position. In other words, portion 42 functions as a strut under endwise compression rather than as a simple wedge in groove 40.

Figure 3:
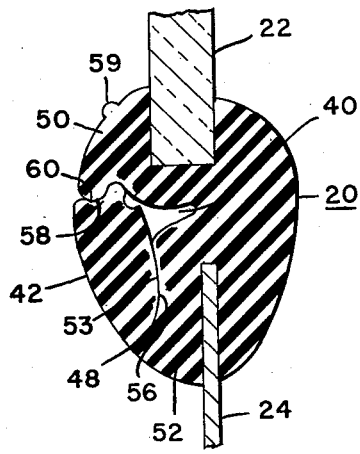
Fig. 3 shows the strip as in Fig. 2 with the panel engaging lip locked in sealing engagement when an integral swinging strut member is pressed into interlocked position.

The inner end surface 54 of strut 42 is rounded and shaped to conform with a surface 56 on the side of enlargement 52 for pressing thereagainst when the strut 42 is inwardly pivoted into final position as in Fig. 3. Similarly, the upper, free extremity of strut 42 has a surface 58 that is complementary in shape to a surface 60 on enlargement 50 and when in final position bears directly against the surface 60 of enlargement 50 (as in Fig. 3), so the whole reaction force of strut 42 is exerted directly against the relatively stiff enlargements 50 and 52 to force the lips 50 and 52 to bodily swing into pressure contact with their respective panels 22 and 24.

Further the strut 42 is adapted to be outwardly pivoted about its flexible neck portion 48 and open groove 40 for receiving the enlarged portion 50 of lip 26 when the lip is retracted. The lip is held in its retracted position by a suitable holding means such as a projection 59 formed on the surface thereof which is received in a depression 61 formed on the surface of strut 42 thus holding the groove 30 open for permitting the glass panel to be inserted without hindrance therein.

The walls of lips 26, 28, 32, and 34 which cooperate to define grooves 30 and 36 are tapered so the grooves 30 and 36 are widest at the root portions and narrowest at the outer extremity portions. The tapered construction of these walls will aid the sealing qualities of the strip herein disclosed for when the panels are inserted into the respective grooves, the lip portions will be spread and thereby partially deform the strip body to increase the compressive force exerted by strut 42 and enable the lips to form a tighter seal with the margin of the panel which it engages.

Figure 2:
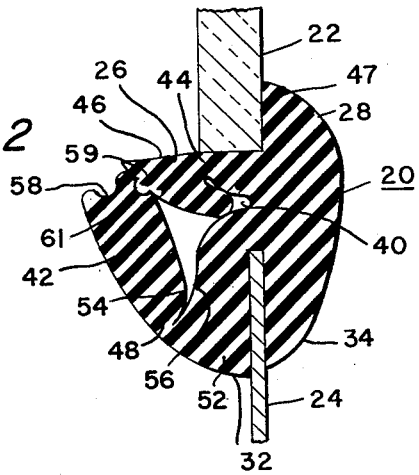
Fig. 2 shows the same strip with the two panels to be connected thereby located in longitudinal grooves therein, with a lip forming a portion of one of the grooves in a retracted position for free passage of the engaging position.
Figure 4:
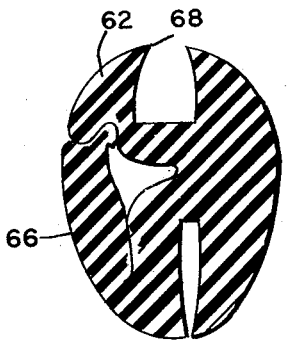
Fig. 4 shows a modification of the strip as shown in Fig. 1.
Figure 5:
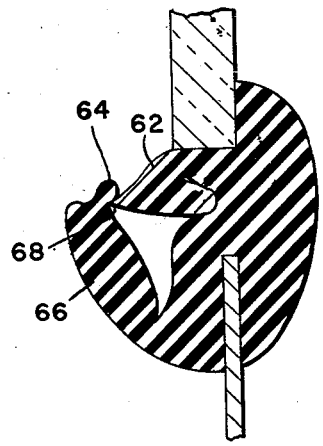
Fig. 5 shows the modified form as described in Fig. 2.
Figure 6:
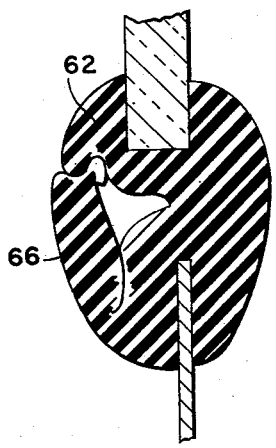
Fig. 6 shows the modified form of the strip as described in Fig. 3.

In Figs. 4, 5 and 6 a modification of the strips in Figs. 1, 2, 3, is shown. In this embodiment the securing of lip 62 in its retracted position, as shown in Fig. 5, is accomplished by having a projection 64 on strut 66 engage a sharp edge portion 68 on lip 62. The other portions of the strip and their functions are similar to that previously described.

Preferably when assembling the mounting strips upon panels 22 and 24, panel 24 is first inserted in its respective groove 36. The wing or lip 26 may be bent back on its hinge portion 44 into groove 40 where it is held in an out-of-the-way position when the holding means on strut 42 and lip 26 engage one another to permit the glass panel 22 to pass laterally beyond lip 26 into its groove 30. For instance if the panel of glass 22 is to be mounted into a rigid opening in sheet metal as represented by panel 24, the mounting strip may be first applied about the edge of the metal panel 24 opening and then lip 26 may be bent back and there held to such an extent as to permit the glass panel to be placed without hindrance in its groove 30. When this is accomplished the lip 26 is released from its retracted position so that it may pivot on hinge portion 44 into a panel engaging position where it is secured as strut 42 is forced into its final position to apply a compressive force against the respective panel engaging lips. It is apparent that the arrangement of the respective grooves and strut member may be reversed so that the strip may be used to first engage the marginal end of the glass panel and be then applied to the opening in the metal of the body in a manner hereinbefore set forth.

It is manifest that the material of the sealing strip may be of any suitable compounded and cured elastomeric material, such as rubber, synthetic rubbers, such as butadiene styrene copolymers, butadiene acrylonitrile copolymers, polychloroprene, compatible mixtures of the above materials, plastic compounds such as certain of the vinyls, etc., the only requirement being that the material is sufficiently springy and rubber-like so that it will be stretched so as to permit unimpeded movement of the thin hinged portion and to form a satisfactory interlock when the strut portion of the strip is forced into its locked position. Strips of this character may be made by molding or extrusion or any other satisfactory production method and may be compounded so as to form any color combination desired. Further the strip may be used to join two panels of wood, metal, glass, etc., or any combination thereof the use of such strips not being limited to glass metal combinations alone. It is understood that variation in the width of grooves and relative position thereof may be carried out to meet specific installation requirements.

While the embodiment of the present invention as herein disclosed, constitutes a preferred form, it is to be understood that other forms might be adopted.

What is claimed is as follows:

1. In an elastomeric sealing strip having two pairs of lips defining a pair of oppositively disposed grooves on opposite sides of a strip body that are adapted to sealingly connect margins of panels to be joined therein, a means for holding one of said lips in a retracted position for facilitating the assembly of the strip and panel and a means integrally formed with said strip body for holding said one lip in a panel engaging position; said first mentioned means comprising; a depression on said second means engageable with a projection on said one lip when said lip is only in said retracted position.

2. A device for connecting panels in cushioning relation comprising, a longitudinally extending strip of elastomeric material having a main body and two integral wing portions adapted to press against the adjacent marginal faces of the two panels to be connected thereby, said main body having a longitudinal hollow into which one of said wing portions can be swung to facilitate assembling of said strip and said panels, each of said wing portions having a laterally extending stiffening enlargement at its outer end, one of said wing portions having an integral strut portion of substantial thickness and rigidity hingedly joined to its stiffening enlargement by a relatively thin and flexible neck, the other of said wing portions having a portion of its surface complementary in shape to a depressed surface portion of said strut for forming a holding engagement therewith and being hingedly joined to said main body by a thin and flexible neck, said strut and said other wing both being bodily swingable about said necks as a hinge and in one relative position only being adapted to have the complementary surfaces thereof engage each other for holding said wing in said hollow and facilitate the unimpeded passage of a panel past said wing during assembly of said strip and panel, said strut when in another relative position only being adapted to directly lockingly abut and spread apart said two stiffening enlargements and force the outer ends of said two wing portions directly against their respective panels.

3. A device for connecting panels in cushioning relation comprising, a longitudinally extending strip of elastomeric material having a main body and two integral wing portions adapted to press against the adjacent marginal faces of the two panels to be connected thereby, said main body having a longitudinal hollow into which one of said wing portions can be swung to facilitate assembling of said strip and said panels, each of said wing portions having a laterally extending stiffening enlargement at its outer end, one of said wing portions having an integral strut portion of substantial thickness and rigidity hingedly joined to its stiffening enlargement by a relatively thin and flexible neck, the other of said wing portions having a sharp edge portion that is adapted to be engaged by a hooked portion on said strut for forming a holding engagement therewith and being hingedly joined to said main body by a thin and flexible neck, said strut and said other wing both being bodily swingable about said necks as a hinge and in one relative position to each other being adapted to hold said wing in said hollow when said sharp edge and hooked portions engage each for facilitating the unimpeded passage of a panel past said wing during assembly of said strip and panel and said strut when in another relative position to directly abut and spread apart said two stiffening enlargements and thereby force the outer ends of said two wing portions directly against their respective panels.

4. A device for connecting panels in cushioning relation comprising, a longitudinally extending strip of elastomeric material having a main body and two integral wing portions adapted to press against the adjacent marginal faces of the two panels to be connected thereby, said main body having a longitudinal hollow into which one of said wing portions can be swung to facilitate assembling of said strip and said panels, each of said wing portions having a laterally extending stiffening enlargement at its outer end, one of said wing portions having an integral strut portion of substantial thickness and rigidity hingedly joined to its stiffening enlargement by a relatively thin and flexible neck, the other of said wing portions having a projection of its surface complementary in shape with a depression on said strut for forming a holding engagement therewith and being hingedly joined to said main body by a thin and flexible neck, said strut and said other wing both being bodily swingable about said necks as a hinge and in one relative position to each other being adapted to hold said wing in said hollow when said depression and projections engage each for facilitating the unimpeded passage of a panel past said wing during assembly of said strip and panel and when in another relative position to directly abut and spread apart said two stiffening enlargements and thereby force the outer ends of said two wing portions directly against their respective panels.

5. A device for connecting panels in cushioning relation comprising a longitudinally extending elastomeric strip having integral wing portions adapted to overlie the marginal faces of the panels to be joined and having a normally closed hollow into which when open, one of said wing portions is adapted to be flexed against the elasticity of the elastomer, and an integral strut portion of substantial thickness and rigidity normally closing said hollow and bearing against said wing portion to compressively hold the wing portion against flexing, said abutment being flexible to open said hollow and having a depression on a surface portion thereof adapted to engage a surface portion of said wing for holding said wing in said hollow for facilitating the assembly of said strip and panel.

References Cited in the file of this patent

UNITED STATES PATENTS

| | | |
|---|---|---|
| 2,189,138 | Eichner | Feb. 6, 1940 |
| 2,288,329 | Smith | June 30, 1942 |
| 2,469,183 | Small | May 3, 1949 |
| 2,492,566 | Geyer | Dec. 27, 1949 |